United States Patent [19]
Dai

[11] Patent Number: 4,942,949
[45] Date of Patent: Jul. 24, 1990

[54] ANTISLIPPING DEVICE FOR CARS IN A STATIONARY STATE

[76] Inventor: Yeu J. Dai, 2F1, No. 5, Lane 158, Sec. 2, Pao-Fu Road, Yungho, Taipei Hsien, Taiwan

[21] Appl. No.: 364,098

[22] Filed: Jun. 12, 1989

[51] Int. Cl.⁵ .............................................. B60K 41/20
[52] U.S. Cl. .................................. 192/1.32; 188/265; 192/1.34
[58] Field of Search ..................... 192/1.34, 1.31, 1.32, 192/1.33; 188/265

[56] References Cited

U.S. PATENT DOCUMENTS

| | | | |
|---|---|---|---|
| 2,816,633 | 12/1957 | Schumann | 192/1.31 |
| 3,229,792 | 1/1966 | Hock | 192/1.34 |
| 3,482,666 | 12/1969 | Case et al. | 192/1.34 X |
| 3,513,953 | 5/1970 | Stevens | 192/1.31 |
| 4,076,093 | 2/1978 | Mizuno | 192/1.34 X |
| 4,310,064 | 1/1982 | Kazarian | 192/1.31 X |
| 4,696,222 | 9/1987 | Han | 192/1.32 |

Primary Examiner—Rodney H. Bonck
Attorney, Agent, or Firm—Cushman, Darby & Cushman

[57] ABSTRACT

The present invention discloses an antislipping device for cars in a stationary state, which is able to automatically hold the brakes of cars in a stationary state so as to prevent them from moving when stationed on inclined ground. The antislipping device for cars in a stationary state includes a tachometer for detecting the rotation of the car wheels and outputing signal which indicates if the car wheels are in a state of rotation or not; a hold device for preventing the brake pedal of the car from moving backward and holding on the brake pedal when the brake pedal is trodden down to stop the moving of the car; and a CPU electrically connected with the tachometer and the device, for receiving the output signal from the tachometer and conducting the hold device to release the brake pedal when the wheels of the car are kept still and the accelerator pedal of the car is trodden down to exceed a predetermined extent.

2 Claims, 3 Drawing Sheets

ANTISLIPPING DEVICE FOR CARS IN A STATIONARY STATE

BACKGROUND OF THE INVENTION

The present invention relates generally to an antislipping device for cars in a stationary state, especially to a device able to hold the brakes of cars in a stationary state so as to prevent them from moving when stationed on inclined ground.

A car driver should pull up or press down the emergency brake of the car so as to avoid the car from slipping when stationed on an inclined ground. However, sometimes a car driver may forget to pull up or press down the emergency brake when the car is parked. At such times, if the the ground of a parking lot is inclined, then the car will begin to slip down and an accident will inevitably occur. Similarly, if the car is halted on a sloping road and the driver forgets to keep on treading the brake pedal or forgets to pull up the emergency brake, then the car will begin to slip down and collide with the car halted behind or ahead.

Furthermore, a car driver is apt to forget to release the emergency brake or release the emergency brake incompletely. In such cases, the brake lining will be worn out rapidly.

SUMMARY OF THE INVENTION

The primary object of the present invention is to provide an antislipping device for cars in a stationary state, which is able to hold the brake of a car when the brake pedal has been trodden down to stop the moving of the car.

It is another object of the present invention to provide an antislipping device for cars in a stationary state, which is able to hold the brake of a car when the brake pedal has been trodden down, and to release automatically the brake when the accelerator pedal of the car is trodden down to a certain extent.

In accordance with the present invention, an antislipping device for cars in a stationary state, which includes: means for detecting the rotation of the car wheels and constantly outputting signal which indicates if the wheels of the car are in a state of rotation or not;

means for preventing the brake pedal of the car from moving backward and holding on the brake pedal when the brake pedal is trodden down to stop the moving of the car; and control means electrically connected with the detect means and the prevent means, for receiving the output signal from the detect means and conducting the prevent means to release the brake pedal when the car wheels are kept still and the accelerator pedal of the car is trodden down to exceed a predetermined extent.

BRIEF DESCRIPTION OF THE DRAWINGS

The present invention can be more fully understood by reference to the following description and accompanying drawings, which form an integral part of this application.

DETAILED DESCRIPTION OF THE PREFERRED EMBODIMENT

Figures 1, 6:
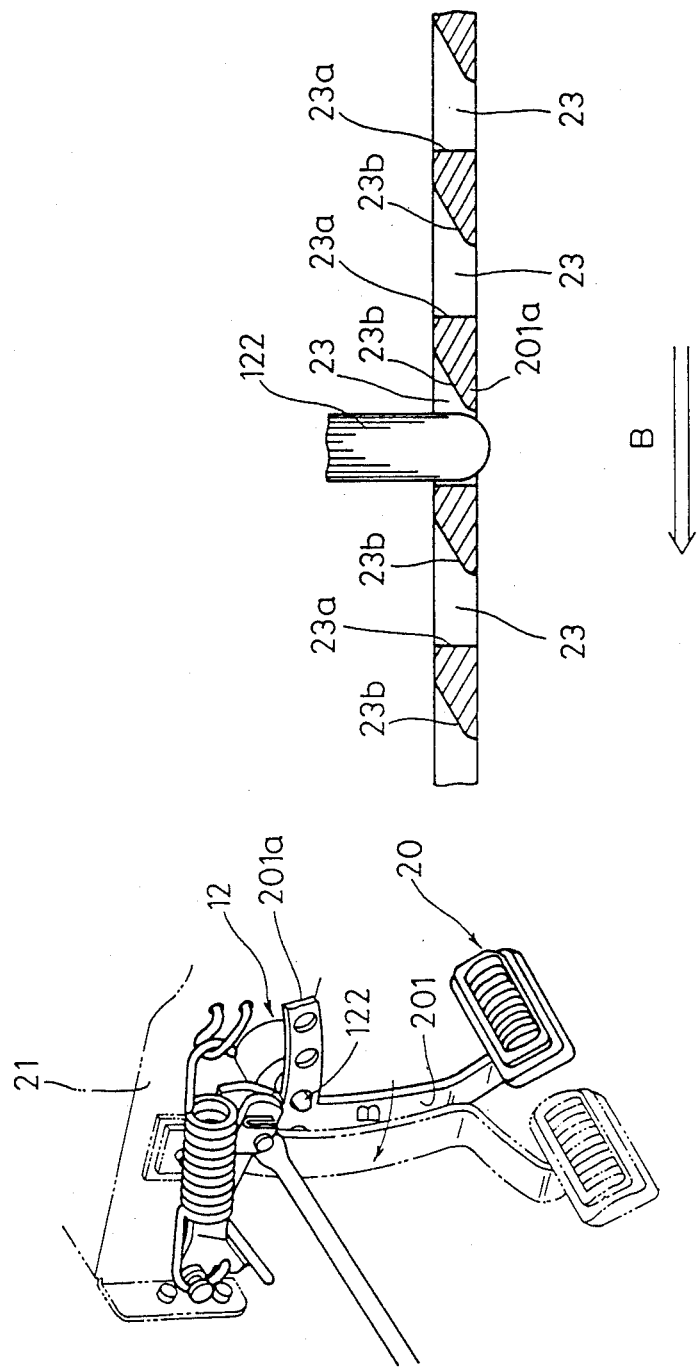
FIG. 1 is a perspective view showing an electromagnetic latch according to this invention mounted near the brake pedal of a car to facilitate the holding of the brake pedal.
FIG. 6. is a sectional view along line 6—6 of FIG. 1.
Figure 3:
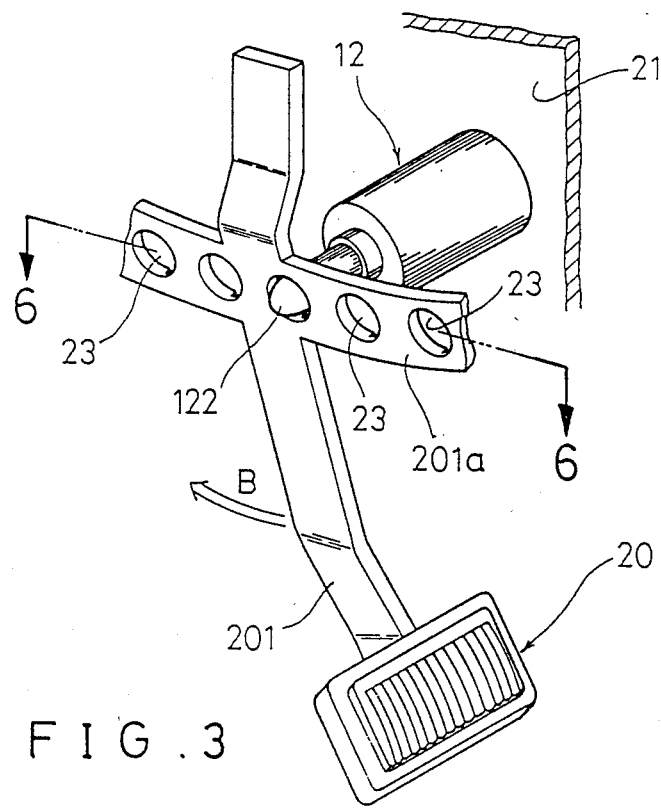
FIG. 3 is an enlarged perspective view showing how the electromagnetic latch holds the brake pedal.
Figures 4, 5:
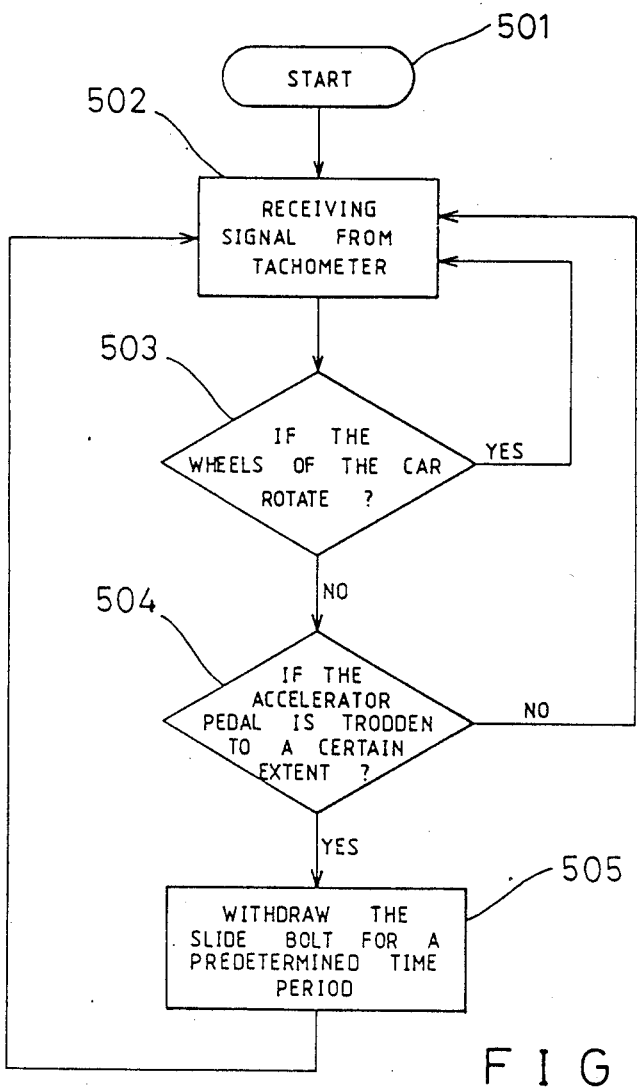
FIG. 4 is a block diagram of this invention showing that a CPU is connected with a tachometer, a sensor and an electromagnetic latch by way of an input port and an output port respectively.
FIG. 5 is a flowchart showing the operation of the CPU.

As shown in FIG. 4, the antislipping device for cars in a stationary state according to this invention comprises a CPU 10, a tachometer 11, an electromagnetic latch 12 and a sensor 15. It should be noted that the tachometer 11 can be of any form as long as it can detect the rotation of the car wheels. In this embodiment, the tachometer 11 can be a conventional one mounted near one of the car wheels. The sensor 15 is mounted near the accelerator pedal (not shown) of the car. As shown in FIG. 1, the electromagnetic latch 12 is mounted near a retainer plate 201a of the link 201 of the brake pedal 20 of the car. The CPU 10 is accommodated within a suitable space in the car. The retainer plate 201a is integrally formed with the link 201 of the brake pedal 20. As shown in FIG. 3, the retainer plate 201a has a plurality of holes 23. The sectional views of the holes 23 are shown in FIG. 6. As shown in FIG. 6, each hole 23 has a slop side wall 23b so that the retainer plate 201a is able to move (relative to the slide bolt 122) in the direction of the arrow B without any impedance, and is prevented from moving in the reversed direction.

The tachometer 11, the electromagnetic latch 12 and the sensor 15 are electrically connected with the CPU 10 by way of an input port 13 and an output port 14. The tachometer 11 is so designed that it constantly outputs a signal to the CPU 10 which indicates whether the wheels of the car are rotating or not. The sensor 15 is designed to output a signal to the CPU 10 when it senses the accelerator pedal (not shown) of the car is trodden down to a certain extent.

Figure 2:
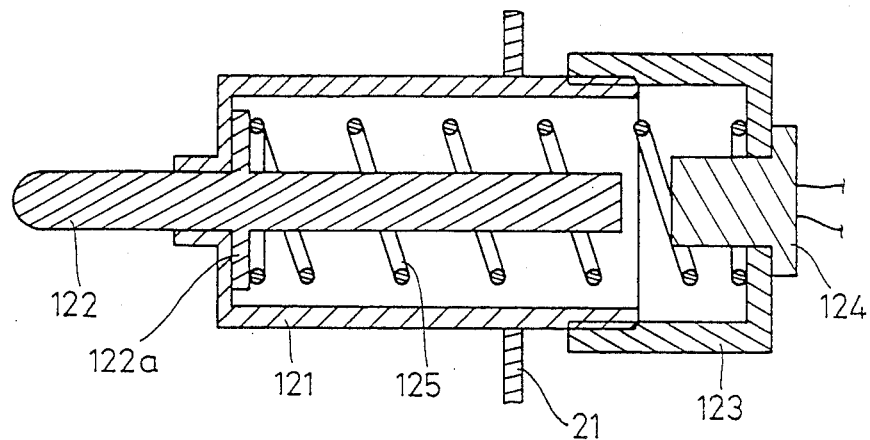
FIG. 2 is a sectional view showing the construction of the electromagnetic latch shown in FIG. 3.

The construction of the electromagnetic latch 12 shown in FIG. 2 comprises a cylindrical housing 121, a slide bolt 122, a cap 123, an electromagnet 124 and a coil spring 125. The slide bolt 122 is slidably mounted within the housing 121 which is threaddedly engaged with the cap 123. The coil spring 125 is accommodated between the flange 122a of the slide bolt 122 and the cap 123, so as to urge the slide bolt 122 away from the electromagnet 124. The electromagnet 124 is secured on the cap 123. When the electromagnet 124 is activated, the slide bolt 122 will be attracted toward the electromagnet 124, that is, the slide bolt 122 will retreat to some extent into the housing 121.

FIG. 3 is an enlarged perspective view showing how the electromagnetic latch 12 holds the brake pedal 20. The slide bolt 122 of the electromagnetic latch 12 penetrates one of the holes 23 of the retainer plate 201a of the brake pedal 20 which has been trodden down (in the direction of the arrow B). In this case, the brake pedal 20 is restrained to be released, that is, the brake pedal 20 is held. If the slide bolt 122 retreats to a certain extent so that it no more hinders the backward motion of the brake pedal 20, then the brake pedal 20 will disengage with the slide bolt 122 and move back to its original position, that is, the brake pedal 20 will be released from being trapped.

The following is a detailed description of the operation of the CPU 10 of the antislipping device according to this invention. As shown in FIG. 5, when the ignition switch (not shown) of the car is turned on, the CPU 10 is activated (step 501) and starts to receive signal from the tachometer 11 (step 502), then, the CPU 10 checks the signal coming from the tachometer 11 (step 503). If the signal coming from the tachometer indicates that the wheels of the car are in a state of rotation, then the process goes back to step 502, that is, keeps on receiving signal from the tachometer 11. If the signal coming from the tachometer indicates that the wheels of the car are kept still, then the CPU checks the sensor 15 (step 504), if the signal coming from the sensor 15 shows that the accelerator pedal is trodden down to a certain extent (described hereinafter), then the CPU conducts the electromagnetic latch 12 to withdraw the slide bolt 122 for a predetermined time period (step 505). After this, the process goes back to step 502 and keeps on running. If the ignition switch is turned off, then the CPU 10 stops working.

By this arrangement, if the car driver treads down the brake pedal 20 (see FIG. 3) to stop the moving of the car, then the slide bolt 122 will be urged by the coil spring 125 to extrude outward and penetrate one hole 23 of the retainer plate 201a to hinder the backward motion of the brake pedal 20. It should be noted that during the treading of the brake pedal 20, the motion of the brake pedal will not be hindered by the slide bolt 122. Thus, if the brake pedal 20 is trodden down to the bottom, then the brake pedal 20 will be held and the car will be trapped when it is a stationary state.

If the car is a stationary state and the driver treads down the accelerator pedal (not shown), then the R.P.M. of the engine will rise. At the time the R.P.M. of the engine reaches a predetermined value, that is, the accelerator pedal is trodden down to a certain extent, the slide bolt 122 of the eletromagnetic latch 12 will be withdrawn and let the brake pedal spring back to its original location, that is, release the brake. At this moment, the driver may release the clutch pedal to drive the car. The slide bolt will retreat automatically when the R.P.M. of the engine reaches a predetermined value, thus avoiding trapping the car.

While the invention has been described in terms of what is presently considered to be the most practical and preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. An antislipping device for vehicles in a stationary state, comprising:
    means for detecting the rotation of one or more wheels of said vehicle and outputting a signal indicating whether or not said wheels are in a state of rotation;
    means for detecting when an accelerator pedal of said vehicle is moved past a predetermined position and outputting a signal indicating the same;
    means for holding a brake pedal of said vehicle in a braked position after said brake pedal has been moved into a braked position, comprising;
    a retainer plate integrally formed with said brake pedal, having a plurality of aligned holes, each of said holes being provided with a taper on one inner side wall;
    a longitudinal housing having a cavity therein and being provided with an opening at one end portion and a through hole at the other end portion, said housing being mounted in proximity to said retainer plate so as to place said through hole opposite said retainer plate;
    a slide bolt slidably mounted within said housing so as to be able to extrude out of said housing through said through hole for a predetermined length and penetrate one of said holes in said retainer plate and also be able to retreat into said housing;
    a cover that covers said opening of said housing;
    means for urging said slide bolt to extrude from said through hole for a predetermined length so as to cause said slide bolt to penetrate one of said holes in said retainer plate, said tapers on said inner wall of said holes being configured so as to force said slide bolt, against said urging means, to retreat into said housing when said brake pedal is moved into a position corresponding to a greater degree of braking;
    electromagnetic means for forcing said slide bolt against said urging means so as to retreat into said housing in response to a control signal from a control means;
    control means electrically connected with said rotational detecting means, said accelerator detecting means and said holding means, for receiving said signals from said detecting means and outputting a control signal to said holding means so as to cause said electromagnetic means to force said slide bolt to retreat into said housing when either said wheels are in a state of rotation or said accelerator pedal is moved past a predetermined position.

2. An antislipping device for cars in a stationary state as described in claim 1, wherein said means for detecting rotation is a tachometer.

* * * * *